July 1, 1930.   F. S. DUNCAN   1,769,876

REPAIR LINK FOR CROSS CHAINS

Filed May 19, 1928

INVENTOR

Patented July 1, 1930

1,769,876

UNITED STATES PATENT OFFICE

FREDERICK S. DUNCAN, OF ENGELWOOD, NEW JERSEY, ASSIGNOR TO AMERICAN CHAIN COMPANY, INC., A CORPORATION OF NEW YORK

REPAIR LINK FOR CROSS CHAINS

Application filed May 19, 1928. Serial No. 278,963.

The present invention relates to tire chains, and has for an object to provide an improved repair chain adapted particularly for repairing the cross chains of a tire chain.

Tire chains are usually formed with a pair of side members connected at intervals by cross chains which are adapted to run transversely across the tread of a tire. Obviously, the links of the cross chain are subjected to considerable wear particularly at or near the middle of the cross chain and are liable to be worn through or to break in time. Usually, this break occurs while the car is on the road, and the loose ends of the cross chain at each side of the break fly out centrifugally as the wheel rotates, striking the fender of the car and making a distressing noise. It is therefore desirable to repair the break at once, not only because of its annoyance but also because if neglected and other cross chains give way, the tire chain may drop off the wheel and be lost.

An object of the present invention is to provide a repair link which may be applied instantly, by any one, without waiting to reach a garage.

Repair links should be made of substantially the same sized stock as that of the cross chain links, so that they will withstand the heavy wear to which the cross chain is subjected. Because the link stock cannot be bent readily with ordinary hand pliers, my improved repair link is provided with open loops which may be hooked through the ends of the broken cross chain, the free ends of the repair link being so disposed that on starting the car, the ends will be bent down by the weight of the vehicle to close the loops of the link.

Cross chains are usually made of curb links, that is, links which are twisted intermediate their ends, so that the plane of the loop at one end of the link is substantially at right angles to the plane of the loop at the other end. Heretofore it has been assumed that repair links must be correspondingly twisted, but I find that a flat link will serve to connect the broken cross chains without twisting the latter, the cooperating portions of the connected cross chain links lying in planes which are oppositely inclined with respect to the plane of the repair link. This considerably simplifies the form and construction of the repair link because the link will lie flat when in position on the tire.

In the accompanying drawings.

Figure 1:
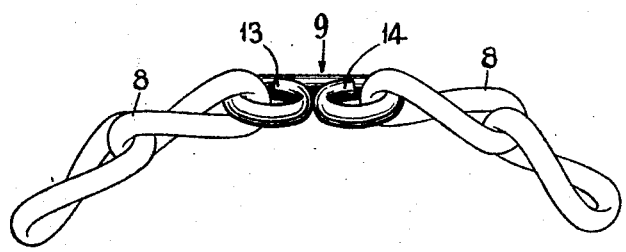
Fig. 1 is a perspective view of a cross chain with one of my repair links applied thereto.
Figure 2:
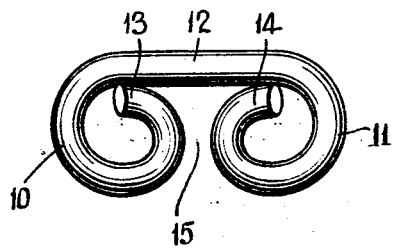
Fig. 2 is a plan view of said repair link before application of the cross chain.
Figure 3:
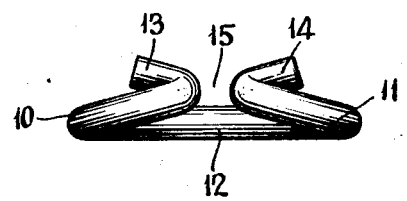
Fig. 3 is a side view of the same.
Figure 4:
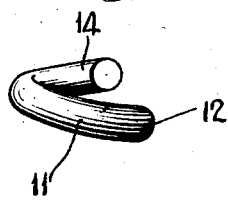
Fig. 4 is an end view looking from the right hand side of Fig. 3.

As best shown in Fig. 2, the repair link consists of a rod bent to form two eyes 10 and 11 connected by a bridge member 12. The eye portions of the link, before the link has been applied to the chain, consist of open loops with end portions 13 and 14 respectively bent upward and inward so that they consist virtually of a pair of opposed helical spirals connected by the bridge member 12. The pitch of the helical end portions 13 and 14 is sufficient to provide clearance between said members and the bridge member 12 so that they may be passed through a cross chain link. Furthermore, there is a space at 15, between the spirals, sufficient to permit the cross chain links to pass therebetween. When a repair link such as this is used to connect the ends of a broken cross chain, the possibility that the link might fall off or work off before pressure had been applied to the link ends 13 and 14 to close the eyes 10 and 11, is reduced to a minimum. It will be understood that when the vehicle is started, the weight thereof will press the entire link substantially into a single plane, as shown in Fig. 1, in which the broken cross chain members are shown at 8, and the repair link is indicated at 9. The cross chain links connected by this repair link will be kept separated one from the other because they will be held in separate eyes of the repair link.

Figure 5:
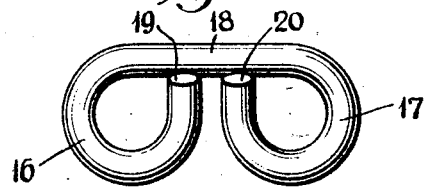
Fig. 5 is a plan view of a slightly modified form of repair link.
Figure 7:
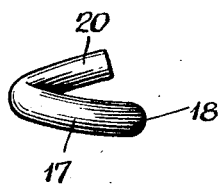
Fig. 7 is the end view looking from the right hand side of Fig. 6.
Figure 6:
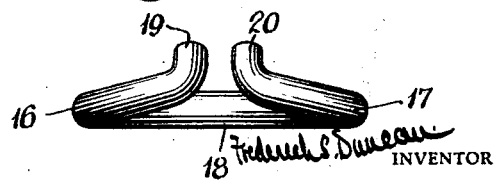
Fig. 6 is a side view of the same.

A modified form of my invention is shown in Figs. 5 to 7 inclusive. This link also consists of two eyes 16 and 17 connected by a bridge 18, but the free ends 19 and 20 of the eye portions 16 and 17, instead of being bent back upon themselves, are bent inward toward the bridge member 18. Normally, these end portions are spaced apart sufficiently to provide clearance for the cross chain links, and are so helically pitched as to provide similar clearance between the link ends and the bridge member 18. As in the case of the link described above, pressure of the vehicle on this repair link will cause the ends 19 and 20 to be bent down into the normal plane of the link, against or in close proximity to the bridge member 18. Thus, the link forms two closed eyes, in each of which is confined a link of the cross chain. The eyes 16 and 17 are necessarily larger than the eyes 10 and 11 and provide more freedom of movement for the cross chain links hooked through them.

While I have described and illustrated two forms of repair links, my invention is not limited to these specific forms. Obviously, either of the repair links could be modified so that one of the end portions would be pitched upward and the other downward if so desired. It is also obvious that either of the links illustrated could be twisted so that the axes of the two eyes would not lie in the same plane. Other slight variations will suggest themselves to anyone skilled in the art, and I consider myself at liberty to make any changes or modifications that fall within the scope and spirit of the appended claims.

I claim:

1. A repair link consisting of a rod bent substantially to the form of the letter "C" with the ends of the rod forming helical loop portions.

2. A repair link consisting of a rod bent substantially to the form of the letter "C" with the ends of the rod forming spiral helical loop portions.

3. A repair link consisting of a rod bent substantially to the form of the letter "C" with the ends of the rod forming oppositely spiraled helical loop portions.

4. A repair link consisting of a rod bent to form two helical loops with a stem integrally connecting the loops, the loops being disposed on the same side of the stem, the free ends of the loops being so disposed with respect to the stem that the loops may be flattened into a common plane with said ends in close proximity to the stem.

5. A repair link consisting of a rod bent to form two helical loops with a stem integrally connecting the loops, the loops being disposed on the same side of the stem and being of spiral form whereby the free ends of the loops will lie within and against the stem when the link is flattened.

6. A repair link consisting of a rod bent to form two oppositely spiraled helical loops with a stem integrally connecting the loops, the loops being spaced apart and disposed on the same side of the stem, the free ends of the loop being so disposed with respect to the stem that the loops may be flattened into a common plane with said ends in close proximity to the stem.

7. A repair link consisting of a rod bent to form two open loops integrally connected by a stem, the loops being disposed on the same side of the stem, the free end portions of the loops being bent transversely to provide a predetermined clearance between said ends and the stem, the ends being also so disposed that when bent back into the plane of the stem they will lie close against the stem to form two closed loops.

In testimony whereof, I have signed this specification.

FREDERICK S. DUNCAN.